United States Patent
Kim et al.

(10) Patent No.: US 11,754,861 B2
(45) Date of Patent: Sep. 12, 2023

(54) POLARIZATION DE-MULTIPLEXING FOR INTENSITY-MODULATED DIRECT-DETECTION (IM-DD) OPTICAL COMMUNICATIONS

(71) Applicant: INTEL CORPORATION, Santa Clara, CA (US)

(72) Inventors: Taehwan Kim, Portland, OR (US); Ganesh Balamurugan, Hillsboro, OR (US); Hao Li, Hillsboro, OR (US); Hasitha Jayatilleka, Toronto (CA)

(73) Assignee: INTEL CORPORATION, Santa Clara, CA (US)

( * ) Notice: Subject to any disclaimer, the term of this patent is extended or adjusted under 35 U.S.C. 154(b) by 208 days.

(21) Appl. No.: 17/360,160

(22) Filed: Jun. 28, 2021

(65) Prior Publication Data

US 2021/0325701 A1 Oct. 21, 2021

Related U.S. Application Data

(62) Division of application No. 15/834,954, filed on Dec. 7, 2017, now Pat. No. 11,126,018.

(51) Int. Cl.
*G02F 1/01* (2006.01)

(52) U.S. Cl.
CPC ................. *G02F 1/0136* (2013.01)

(58) Field of Classification Search
CPC ............. G02F 1/0136; G02F 1/01; G02F 1/00
USPC .......................................... 359/303
See application file for complete search history.

(56) References Cited

U.S. PATENT DOCUMENTS

| 6,125,220 A | 9/2000 | Copner et al. |
| 6,339,474 B2 | 1/2002 | Paiam et al. |
| 2003/0202226 A1 | 10/2003 | Moeller |
| 2010/0245837 A1 | 9/2010 | Yamamoto |
| 2010/0322628 A1* | 12/2010 | Nagarajan .......... G02B 6/12004 398/79 |
| 2012/0170926 A1* | 7/2012 | Van Leeuwen .... H04B 10/0795 398/9 |

(Continued)

OTHER PUBLICATIONS

X. Steve Yoa et al., "All-optic scheme for automatic polarization division demultiplexing," Optics Express, Jun. 11, 2007, vol. 15, No. 12, pp. 7407-7414.

(Continued)

*Primary Examiner* — William R Alexander
(74) *Attorney, Agent, or Firm* — Schwabe, Williamson & Wyatt, P.C.

(57) ABSTRACT

Embodiments include apparatuses, methods, and systems including a dynamic polarization controller (DPC) to receive a first light beam and a second light beam, to adjust a rotation of a state of polarization (SOP) of the first light beam and the second light beam to generate a third light beam and a fourth light beam, under the control of a first control signal, a second control signal, and a third control signal. The first control signal may be related to a phase difference between the third light beam and the fourth light beam, the second control signal may be related to an intensity difference between the third light beam and the fourth light beam, and the third control signal may be related to a rotation of a SOP of the third light beam and the fourth light beam. Other embodiments may also be described and claimed.

16 Claims, 6 Drawing Sheets

(56) References Cited

U.S. PATENT DOCUMENTS

2012/0170937 A1* 7/2012 Van Leeuwen ...... H04B 10/506
398/76
2016/0191163 A1* 6/2016 Preston ................ G01B 11/161
398/16

OTHER PUBLICATIONS

Zinan Wang et al., "Automatic optical polarization demultiplexing for polarization division multiplexed signals," Optics Express, Mar. 2, 2009, vol. 17, No. 5, pp. 3183-3189.
United States Patent Office—Office Action dated Feb. 24, 2021 from U.S. Appl. No. 15/834,954, 9 pages.
United States Patent Office—Notice of Allowance dated May 27, 2021 from U.S. Appl. No. 15/834,954, 10 pages.

* cited by examiner

POLARIZATION DE-MULTIPLEXING FOR INTENSITY-MODULATED DIRECT-DETECTION (IM-DD) OPTICAL COMMUNICATIONS

CROSS REFERENCE TO RELATED APPLICATION

This application is a divisional application of U.S. patent application Ser. No. 15/834,954, entitled "POLARIZATION DE-MULTIPLEXING FOR INTENSITY-MODULATED DIRECT-DETECTION (IM-DD) OPTICAL COMMUNICATIONS", filed Dec. 7, 2017, and claims priority to the Ser. No. 14/184,575 application. The Specification of Ser. No. 15/834,954 is hereby fully incorporated by reference.

FIELD

Embodiments of the present disclosure generally relate to the field of optoelectronics and, more particularly, to optoelectronics for communications.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

To increase data rate for intensity-modulated direct-detection (IM-DD) optical communications over a fiber channel, polarization division multiplexing (PDM) can be a powerful tool. Based on PDM techniques, a single fiber channel may double its spectral efficiency by simultaneously transmitting two independent data streams at the same wavelength in different states of polarization (SOP), e.g., orthogonal. Due to dynamic random drift of the SOP in a fiber channel, it may often be difficult to de-multiplex PDM signals since a receiver may not be able to monitor and actively compensate for the axial-rotation, cross-talks, or other general SOP fluctuations between two polarization channels in real time.

BRIEF DESCRIPTION OF THE DRAWINGS

Embodiments of the photonic integrated circuits with on-chip optical isolator techniques of the present disclosure may overcome these limitations with reduced insertion loss and easier manufacturing process. The techniques will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Based on polarization division multiplexing (PDM) techniques, a fiber channel may double its spectral efficiency by simultaneously carrying two independent data streams at a same wavelength in different states of polarization (SOP), e.g., orthogonal. A SOP of a PDM signal may be distorted by dynamic random drift or cross-talks in a fiber channel where the PDM signals may be transmitted. Existing solutions to remove the distortion caused by the fiber channel may be limited in various ways. For example, some existing techniques may use two light beams with different power to carry two data streams at the same optical wavelength. However, such techniques may post limitations on the architecture of the receivers, leading to expensive solutions. Other techniques may consider only distortion caused by axial rotation while neglecting phase retardation in a fiber channel, which may not be sufficient for de-multiplexing PDM signals to remove general SOP drifts and fluctuations.

Embodiments herein may perform polarization de-multiplexing of PDM signals with general SOP fluctuations based on three feedback control signals with three degrees of freedom (DOF) to explicitly address distortions of SOPs in a realistic fiber channel. Three control signals may be generated by a control signal generator to control a dynamic polarization controller (DPC) to adjust SOPs of two light beams at a same wavelength carrying two data streams. A first control signal may represent a phase difference between a first light beam and a second light beam, a second control signal may represent an intensity difference between the first light beam and the second light beam, and a third control signal may represent a rotation of a SOP of the first light beam and the second light beam. When the two light beams share a same light source and are coherent, the three control signals may have a steady state when a perfect or near-perfect de-multiplexing of the first light beam and the second light beam is achieved. The control signal generator may be constructed to force the three control signals to be in a steady state (or approximately steady state) to achieve a perfect or almost perfect de-multiplexing. In addition, the control signal generator may share some components with a receiver while replacing complex signal processing such as optimization-based control by simple proportional-integral-derivative controller (PID) controls, hence reducing the complexity of the optoelectronics for de-multiplexing PDM signals. Embodiments herein may have a wide variety of applications, e.g., in short-reach low cost fiber optical channels for intra-data center communications.

In various embodiments, a control signal generator may include an optical mixer, a first intensity detector, a second intensity detector, and a signal generator coupled to the optical mixer, the first intensity detector, and the second intensity detector. The optical mixer may receive a first light beam and a second light beam to generate an optical mixer output. The first intensity detector may receive the first light beam and generate a first light intensity output, while the second intensity detector may receive the second light beam and generate a second light intensity output. The signal generator may receive the optical mixer output, the first light intensity output, and the second light intensity output, and generate a first control signal, a second control signal, and a third control signal. The first control signal, the second control signal, and the third control signal may be coupled to a DPC. The first control signal may represent a phase difference between the first light beam and the second light beam, the second control signal may represent an intensity difference between the first light beam and the second light beam, and the third control signal may represent a SOP of the first light beam and the second light beam.

In various embodiments, an optical communication device may include a first phase shifter section, a second phase shifter section coupled to the first phase shifter section through a first directional coupler, and a third phase shifter section coupled to the second phase shifter section through a second directional coupler. The first phase shifter section may be controlled by a first control signal and receive a first light beam and a second light beam. The second phase shifter section may be controlled by a second control signal. The third phase shifter section may be controlled by a third control signal to generate a third light beam, and a fourth light beam. The first control signal may be related to a phase difference between the third light beam and the fourth light beam, the second control signal may be related to an intensity difference between the third light beam and the fourth light beam, and the third control signal may be related to a rotation of a SOP of the third light beam and the fourth light beam.

In various embodiments, a method for optical communication may include: receiving a combined light beam from a fiber channel to generate a first light beam and a second light beam; adjusting, by a DPC, a rotation of a SOP of the first light beam and the second light beam to generate a third light beam and a fourth light beam; and receiving, by the DPC, a first control signal, a second control signal, and a third control signal. The third light beam and the fourth light beam may be generated based on the first control signal, the second control signal, and the third control signal. The first control signal may be related to a phase difference between the third light beam and the fourth light beam, the second control signal may be related to an intensity difference between the third light beam and the fourth light beam, and the third control signal may be related to a rotation of a SOP of the third light beam and the fourth light beam.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. It will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

As used herein, the term "module" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable components that provide the described functionality.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

Figure 1:
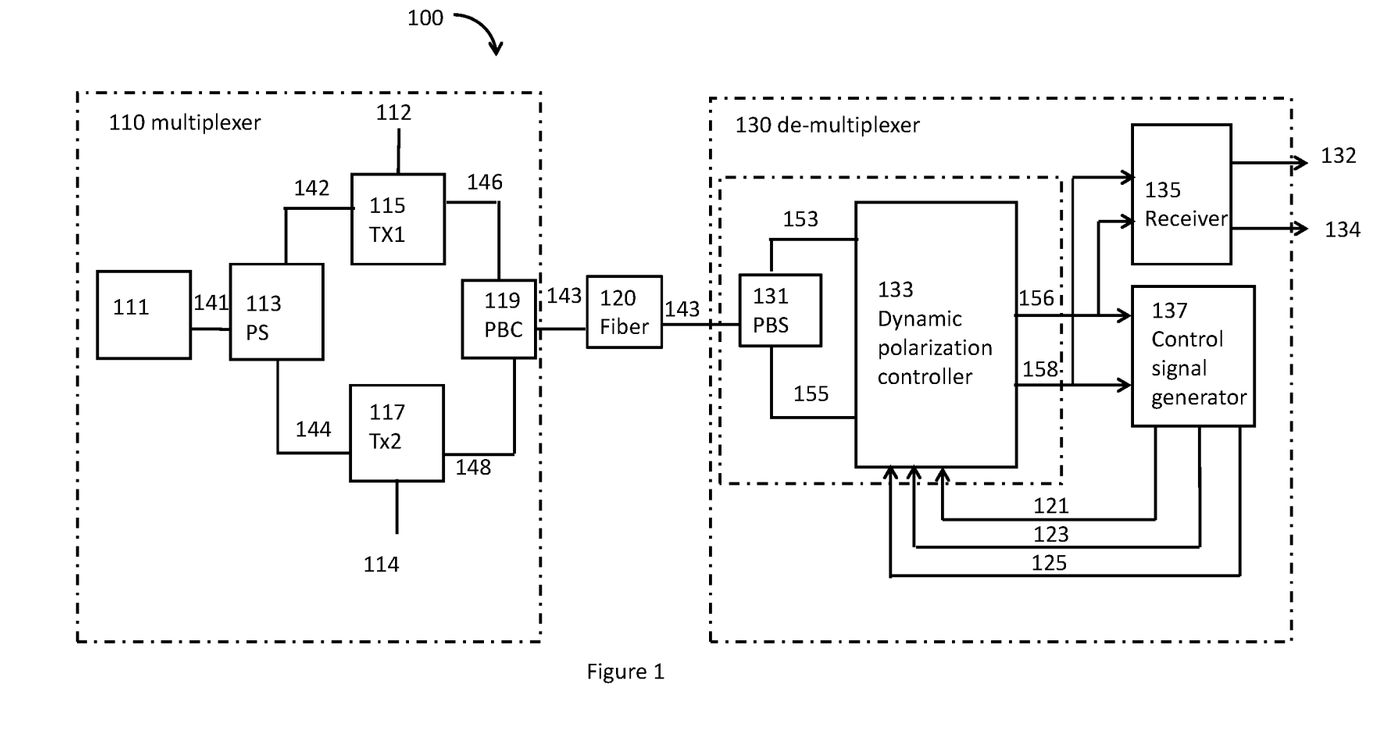
FIG. 1 schematically illustrates a block diagram of an optical communication system for polarization division multiplexing (PDM) including a control signal generator with three control signals, a dynamic polarization controller, and a receiver, according to various embodiments.

FIG. 1 schematically illustrates a block diagram of an optical communication system 100 for PDM including a control signal generator 137 with three control signals, e.g., a control signal 121, a control signal 123, and a control signal 125, a DPC 133, and a receiver 135, according to various embodiments. For clarity, features of the optical communication system 100, the control signal generator 137, the DPC 133, and the receiver 135 may be described below as an example for understanding an example optical communication system for PDM including a control signal generator with three control signals, a DPC, and a receiver. It is to be understood that there may be more or fewer components included in the optical communication system 100, the control signal generator 137, the DPC 133, and the receiver 135. Further, it is to be understood that one or more of the devices and components within the optical communication system 100, the control signal generator 137, the DPC 133, and the receiver 135 may include additional and/or varying features from the description below, and may include any devices and components that one having ordinary skill in the art would consider and/or refer to as the devices and components of an optical communication system, a control signal generator with three control signals, a DPC, and a receiver.

In embodiments, the optical communication system 100 may include a multiplexer 110 to communicate with a de-multiplexer 130 through a fiber channel 120. The multiplexer 110 may include a light source 111, a power splitter 113, a modulator 115, a modulator 117, and a polarization beam combiner (PBC) 119. A light beam 141 may emit from the light source 111, and be evenly split into two waveguides by the power splitter 113 to become a light beam 142 and a light beam 144. The light beam 142 may go through the modulator 115, where a data stream 112 may be modulated by the modulator 115 over the light beam 142 to generate a modulated light beam 146. Similarly, the light beam 144 may go through the modulator 117, where a data stream 114 may be modulated by the modulator 117 over the light beam 144 to generate a modulated light beam 148. The data stream 112 and the data stream 114 may be independent from each other. The modulator 115 or the modulator 117 may modulate the light beam 142 or the light beam 144 by intensity of the light beams. The modulated light beam 146 may carry the data stream 112 in a first polarization with a rotation of a SOP at an optical wavelength. The modulated light beam 148 may carry the data stream 114 in a second polarization with a rotation of a SOP at the same optical wavelength, where the second polarization may be different from the first polarization, e.g., orthogonal. For example, the modulated light beam 146 may carry the data stream 112 in a transverse electric (TE) mode, and the modulated light beam 148 may carry the data stream 114 in a transverse magnetic (TM) mode orthogonal to the TE mode. The PBC 119 may combine the modulated light beam 146 and the modulated light beam 148 to generate a combined light beam 143, which may be transmitted through the fiber channel 120.

In embodiments, the de-multiplexer 130 may be coupled to the fiber channel 120 to receive the combined light beam 143. The de-multiplexer 130 may include a polarization beam splitter (PBS) 131, the DPC 133 coupled to the PBS 131, the control signal generator 137, and the receiver 135. The PBS 131 may receive the combined light beam 143 from the fiber channel 120 to generate a light beam 153 and a light beam 155. The light beam 153 and the light beam 155 may be similar to the modulated light beam 146 and the modulated light beam 148. For example, the light beam 153 may carry the data stream 112 in a first polarization with a rotation of a SOP at an optical wavelength, while the light beam 155 may carry the data stream 114 in a second polarization with a rotation of a SOP at the same optical wavelength, where the second polarization may be different from the first polarization, e.g., orthogonal. For example, the light beam 153 may be a TE mode light beam carrying the data stream 112, while the light beam 155 may be a TM mode light beam carrying the data stream 114.

The DPC 133 may be coupled to the PBS 131 to receive the light beam 153 and the light beam 155, and to adjust a first state of polarization (SOP) of the light beam 153 to generate a light beam 156, and to adjust a second SOP of the light beam 155 to generate a light beam 158. For example, the light beam 156 may be obtained by removing the rotation of the SOP at the optical wavelength caused by the fiber channel 120 from the light beam 153, and the light beam 158 may be obtained by removing the rotation of the SOP at the optical wavelength caused by the fiber channel 120 from the light beam 155.

The control signal generator 137 may be coupled to the DPC 133 to receive the light beam 156 and the light beam 158, and to generate the control signal 121, the control signal 123, and the control signal 125. The control signal 121 may represent a phase difference between the light beam 156 and the light beam 158, the control signal 123 may represent an intensity difference between the light beam 156 and the light beam 158, and the control signal 125 may represent a rotation of a SOP of the light beam 156 and a rotation of a SOP of the light beam 158. The light beam 156 and the light beam 158 may be generated by the DPC 133 based on the control signal 121, the control signal 123, and the control signal 125.

The receiver 135 may be coupled to the DPC 133 to receive the light beam 156 and the light beam 158, and to detect the data stream 132 based on the light beam 156, and to detect the data stream 134 based on the light beam 158. The data stream 132 may be substantially identical to the data stream 112, and the data stream 134 may be substantially identical to the data stream 114. The receiver 135 may be implemented independently from the control signal generator 137. In some embodiments, the receiver 135 may share some components with the control signal generator 137, hence reducing the overall complexity of the de-multiplexer 130.

Figure 2:
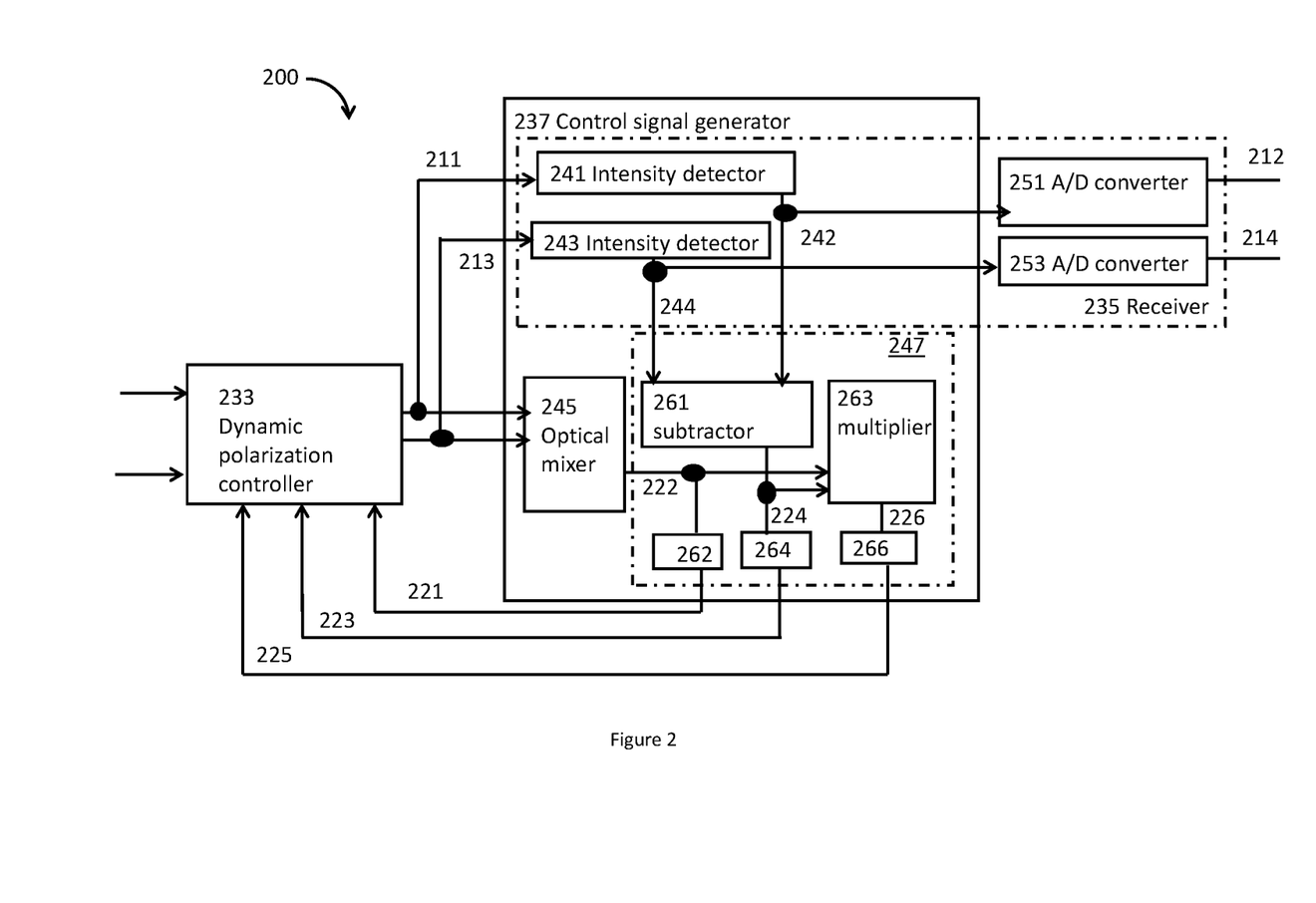
FIG. 2 schematically illustrates a block diagram of a control signal generator coupled to a dynamic polarization controller and a receiver for an optical communication system, according to various embodiments.

FIG. 2 schematically illustrates a block diagram 200 of a control signal generator 237 coupled to a DPC 233 and a receiver 235 for an optical communication system, according to various embodiments. In embodiments, the control signal generator 237, the DPC 233, and the receiver 235 may be examples of the control signal generator 137, the DPC 133, and the receiver 135, as shown in FIG. 1, and perform similar functions respectively.

In embodiments, the control signal generator 237 may include a first intensity detector 241, a second intensity detector 243, an optical mixer 245, and a signal generator 247 including an analog voltage subtractor 261, an analog multiplier 263, a first integrator 262, a second integrator 264, and a third integrator 266. The receiver 235 may include the first intensity detector 241, the second intensity detector 243, a first analog-to-digital converter 251, and a second analog-to-digital converter 253. The control signal generator 237 may receive a light beam 211 and a light beam 213 from the DPC 233, which may be fed into the first intensity detector 241 and the second intensity detector 243 shared by the control signal generator 237 and the receiver 235. In addition, the light beam 211 and the light beam 213 may be fed into the optical mixer 245 of the control signal generator 237. The control signal generator 237 may generate a control signal 221, a control signal 223, and a control signal 225, which may be coupled to the DPC 233 to control the generation of the light beam 211 and the light beam 213. The control signal 221 may represent a phase difference between the light beam 211 and the light beam 213. The control signal 223 may represent an intensity difference between the light beam 211 and the light beam 213. The control signal 225 may represent a rotation of a SOP of the light beam 211 and the light beam 213.

In detail, the optical mixer 245 may receive the light beam 211 and the light beam 213 and generate an optical mixer output 222. The first intensity detector 241 may receive the light beam 211 to generate a first light intensity output 242, and the second intensity detector 243 may receive the light beam 213 to generate a second light intensity output 244. The signal generator 247 may be coupled to the optical mixer 245, the first intensity detector 241, and the second intensity detector 243, and include the analog voltage subtractor 261, the analog multiplier 263, the first integrator 262, the second integrator 264, and the third integrator 266.

The analog voltage subtractor 261 may be coupled to the first intensity detector 241 and the second intensity detector 243, to receive the first light intensity output 242 and the second light intensity output 244, and to generate a subtractor output 224. The analog multiplier 263 may be coupled to the optical mixer 245 to receive the optical mixer output 222, and coupled to the analog voltage subtractor 261 to receive the subtractor output 224, and to generate a multiplier output 226. The first integrator 262 may be coupled to the optical mixer 245 to receive the optical mixer output 222 to generate the first control signal 221, the second integrator 264 may be coupled to the analog voltage subtractor 261 to receive the subtractor output 224 to generate the second control signal 223, and the third integrator 266 may be coupled to the analog multiplier 263 to receive the multiplier output 226 and to generate the third control signal 225.

In addition, the receiver 235 may include the first intensity detector 241, the second intensity detector 243, the first analog-to-digital converter 251, and the second analog-to-digital converter 253. The first analog-to-digital converter 251 may be coupled to the first intensity detector 241 to receive the first light intensity output 242 and to generate a first digital output 212. The second analog-to-digital converter 253 may be coupled to the second intensity detector 243 to receive the second light intensity output 244 and to generate a second digital output 214.

Figure 3:
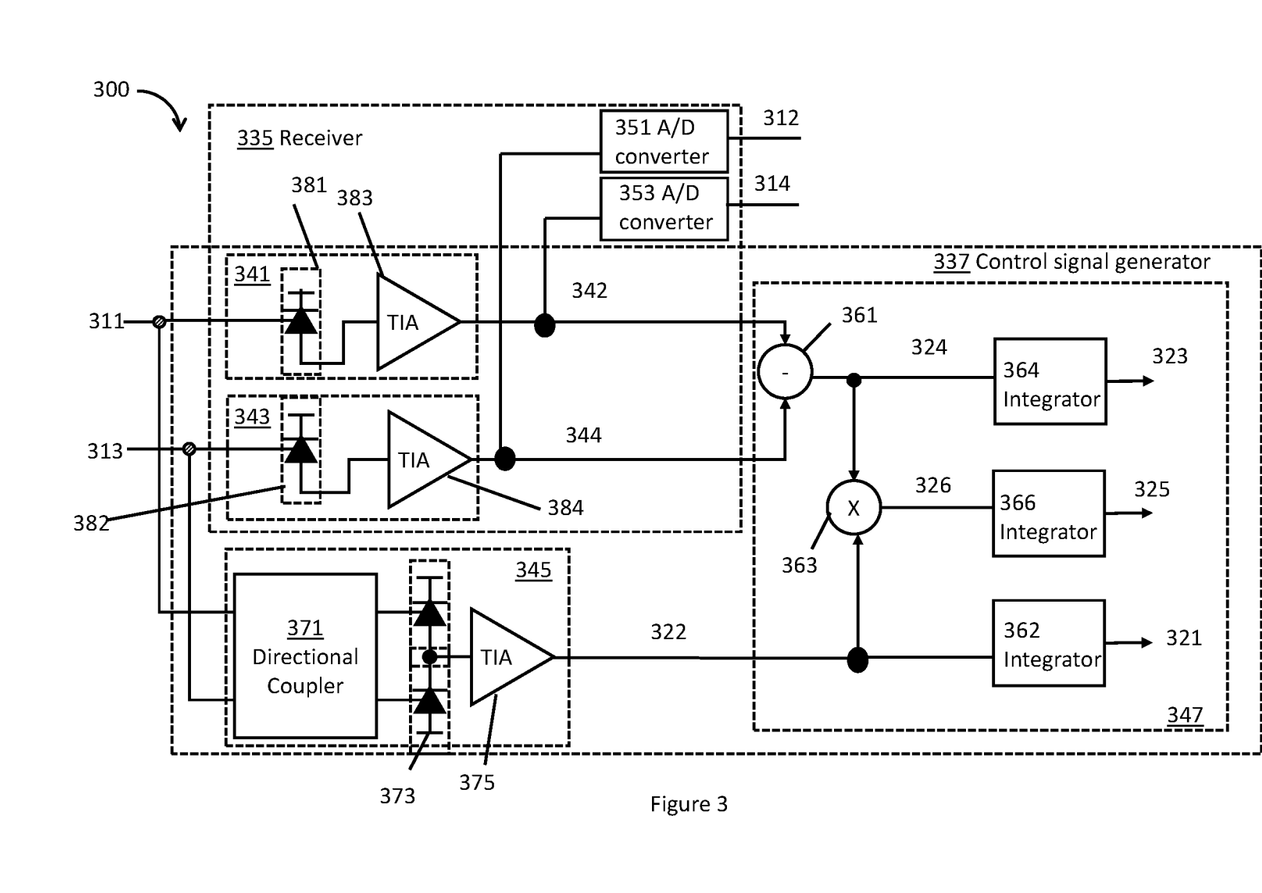
FIG. 3 schematically illustrates a block diagram of a control signal generator coupled to a receiver for an optical communication system, according to various embodiments.

FIG. 3 schematically illustrates a block diagram 300 of a control signal generator 337 coupled to a receiver 335 for an optical communication system, according to various embodiments. In embodiments, the control signal generator 337 and the receiver 335 may be examples of the control signal generator 137 and the receiver 135, as shown in FIG. 1, or the control signal generator 237 and the receiver 235, as shown in FIG. 2.

In embodiments, the control signal generator 337 may include a first intensity detector 341, a second intensity detector 343, an optical mixer 345, and a signal generator 347 including an analog voltage subtractor 361, an analog multiplier 363, a first integrator 362, a second integrator 364, and a third integrator 366. The receiver 335 may include the first intensity detector 341, the second intensity detector 343, a first analog-to-digital converter 351, and a second analog-to-digital converter 353. The control signal generator 337 may receive a light beam 311 and a light beam 313, which may be from a DPC, not shown. The light beam 311 and the light beam 313 may be fed into the first intensity detector 341 and the second intensity detector 343 shared by the control signal generator 337 and the receiver 335. In addition, the light beam 311 and the light beam 313 may be fed into the optical mixer 345 of the control signal generator 337. The control signal generator 337 may generate a control signal 321, a control signal 323, and a control signal 325, which may be coupled to a DPC to control the generation of the light beam 311 and the light beam 313. The control signal 321 may represent a phase difference between the light beam 311 and the light beam 313. The control signal 323 may represent an intensity difference between the light beam 311 and the light beam 313. The control signal 325 may represent a rotation of a SOP of the light beam 311 and the light beam 313.

In detail, the optical mixer 345 may receive the light beam 311 and the light beam 313 and generate an optical mixer output 322. The optical mixer 345 may include a 50/50 directional coupler 371, a balanced photodetector 373 coupled to the 50/50 directional coupler 371, and a transimpedance amplifier (TIA) 375 coupled to the balanced photodetector 373 to generate the optical mixer output 322. In embodiments, the balanced photodetector 373 may measure a phase difference of the light beam 311 and the light beam 313 and generate a current signal, while the TIA 375 may convert the current signal into a voltage signal, which is the optical mixer output 322.

The first intensity detector 341 may receive the light beam 311 to generate a first light intensity output 342, and the second intensity detector 343 may receive the light beam 313 to generate a second light intensity output 344. The first intensity detector 341 may include a first photodetector 381 to receive the light beam 311, and a TIA 383 coupled to the first photodetector 381 to generate the first light intensity output 342. The photodetector 381 may convert the power of the light beam 311 into a current signal, while the TIA 383 may convert the current signal into a voltage signal, which is the first light intensity output 342. The second intensity detector 343 may include a second photodetector 382 to receive the light beam 313, and a TIA 384 coupled to the second photodetector 382 to generate the second light intensity output 344.

The signal generator 347 may be coupled to the optical mixer 345, the first intensity detector 341, and the second intensity detector 343, and include the analog voltage subtractor 361, the analog multiplier 363, the first integrator 362, the second integrator 364, and the third integrator 366. The analog voltage subtractor 361 may be coupled to the first intensity detector 341 and the second intensity detector 343, to receive the first light intensity output 342 and the second light intensity output 344, and to generate a subtractor output 324. The analog multiplier 363 may be coupled to the optical mixer 345 to receive the optical mixer output 322, and coupled to the analog voltage subtractor 361 to receive the subtractor output 324, and to generate a multiplier output 326. The first integrator 362 may be coupled to the optical mixer 345 to receive the optical mixer output 322 and to generate the first control signal 321, the second integrator 364 may be coupled to the analog voltage subtractor 361 to receive the subtractor output 324 and to generate the second control signal 323, and the third integrator 366 may be coupled to the analog multiplier 363 to receive the multiplier output 326 and to generate the third control signal 325.

In addition, the receiver 335 may include the first intensity detector 341, the second intensity detector 343, the first analog-to-digital converter 351, and the second analog-to-digital converter 353. The first analog-to-digital converter 351 may be coupled to the first intensity detector 341 to receive the first light intensity output 342 and to generate a first digital output 312. The second analog-to-digital converter 353 may be coupled to the second intensity detector 343 to receive the second light intensity output 344 and to generate a second digital output 314.

Figure 4:
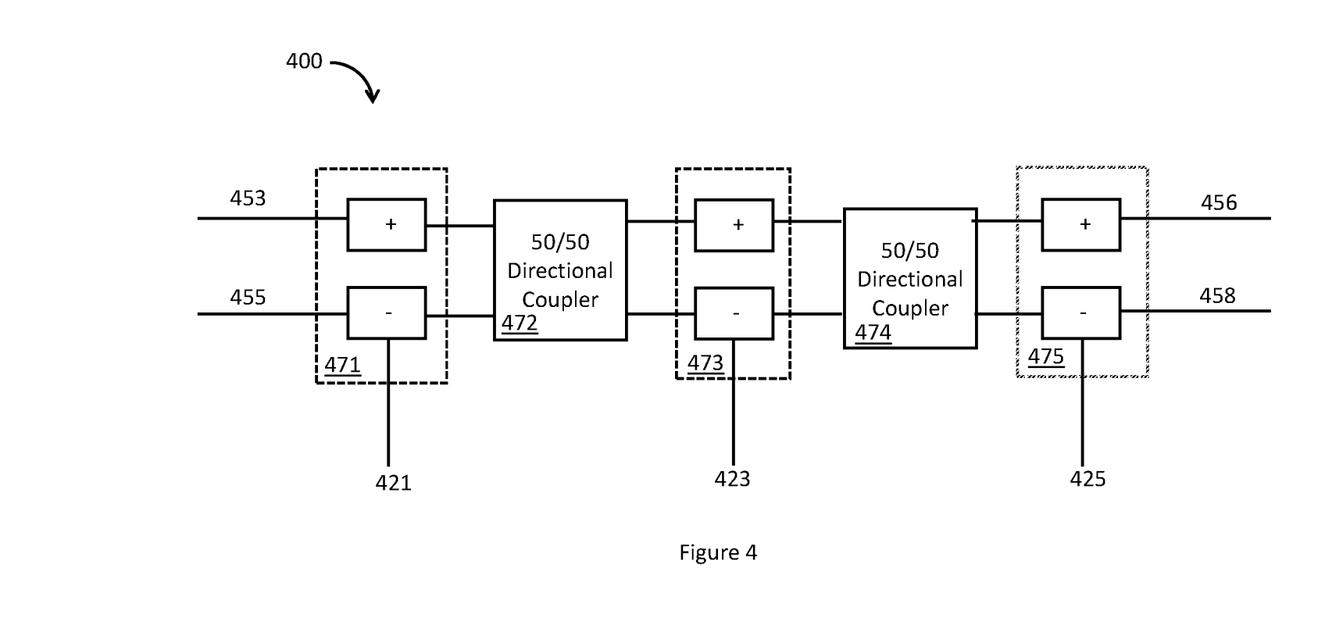
FIG. 4 schematically illustrates a block diagram of a dynamic polarization controller for an optical communication system, according to various embodiments.

FIG. 4 schematically illustrates a block diagram of a DPC 400, according to various embodiments. In embodiments, the DPC 400 may be an example of the DPC 133 as shown in FIG. 1, or the DPC 233 as shown in FIG. 2.

In embodiments, the DPC 400 may include a first phase shifter section 471 controlled by a first control signal 421 and to receive a first light beam 453 and a second light beam 455; a second phase shifter section 473 controlled by a second control signal 423 and coupled to the first phase shifter section 471 through a first directional coupler 472; and a third phase shifter section 475 controlled by a third control signal 425, coupled to the second phase shifter section 473 through a second directional coupler 474, and to generate a third light beam 456, and a fourth light beam 458.

The first control signal 421 may be related to a phase difference between the third light beam 456 and the fourth light beam 458, the second control signal 423 may be related to an intensity difference between the third light beam 456 and the fourth light beam 458, and the third control signal 425 may be related to a rotation of a state of polarization (SOP) of the third light beam 456 and the fourth light beam 458.

Figure 5:
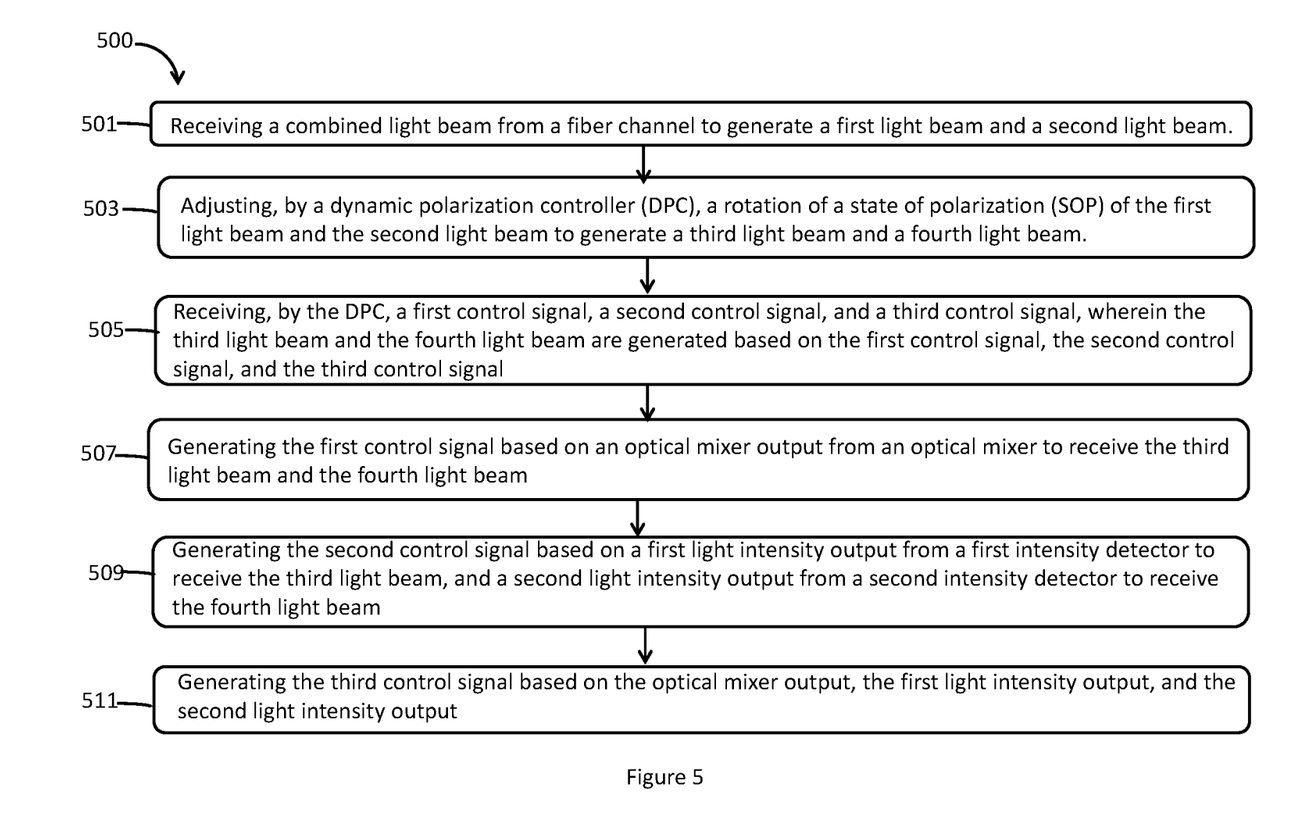
FIG. 5 schematically illustrates a flow diagram of a process for de-multiplexing a combined light beam from a fiber channel to detect two different data streams carried by the combined light beam in an optical communication system, according to various embodiments.

FIG. 5 schematically illustrates a flow diagram of a process 500 for de-multiplexing a combined light beam from a fiber channel to detect two different data streams carried by the combined light beam, according to various embodiments. In embodiments, the process 500 may be performed by the de-multiplexer 130 to receive the combined light beam 143 and to generate the light beam 156 and the light beam 158 as shown in FIG. 1.

At a block 501, the process 500 may include receiving a combined light beam from a fiber channel to generate a first light beam and a second light beam. For example, at the block 501, the process 500 may include receiving the combined light beam 143 from the fiber channel 120 to generate the light beam 153 and the light beam 155, as shown in FIG. 1. In embodiments, the light beam 153 may carry a first data stream in a first polarization with the rotation of the SOP of the light beam 153 and the light beam 155, the light beam 155 may carry a second data stream at a second polarization with the rotation of the SOP of the light beam 153 and the light beam 155, where the second polarization is orthogonal from the first polarization, and the rotation of the SOP of the light beam 153 and the light beam 155 may be caused by the fiber channel 120.

At a block 503, the process 500 may include adjusting, by a DPC, a rotation of a SOP of the first light beam and the second light beam to generate a third light beam and a fourth light beam. For example, at the block 503, the process 500 may include adjusting, by the DPC 133, a rotation of a SOP of the light beam 153 and the light beam 155 to generate the light beam 156 and the light beam 158. In embodiments, the DPC may be similar to the DPC 400 shown in FIG. 4, and may include a first phase shifter section controlled by a first control signal and to receive the first light beam and the second light beam; a second phase shifter section controlled by a second control signal and coupled to the first phase shifter section through a first directional coupler; and a third phase shifter section controlled by a third control signal, coupled to the second phase shifter section through a second directional coupler, and to generate the third light beam, and the fourth light beam.

At a block 505, the process 500 may include receiving, by the DPC, a first control signal, a second control signal, and a third control signal, where the third light beam and the fourth light beam may be generated based on the first control signal, the second control signal, and the third control signal, the first control signal may be related to a phase difference between the third light beam and the fourth light beam, the second control signal may be related to an intensity difference between the third light beam and the fourth light beam, and the third control signal may be related to a rotation of a SOP of the third light beam and the fourth light beam. For example, at the block 505, the process 500 may include receiving, by the DPC 133, the control signal 121, the control signal 123, and the control signal 125, where the light beam 156 and the light beam 158 may be generated based on the control signal 121, the control signal 123, and the control signal 125, the control signal 121 may be related to a phase difference between the light beam 156 and the light beam 158, the control signal 123 may be related to an intensity difference between the light beam 156 and the light beam 158, and the control signal 125 may be related to a rotation of a SOP of the light beam 156 and the light beam 158.

At a block 507, the process 500 may include generating the first control signal based on an optical mixer output from an optical mixer to receive the third light beam and the fourth light beam. For example, at the block 507, the process 500 may include generating the control signal 221 based on the optical mixer output 222 from the optical mixer 245.

At a block 509, the process 500 may include generating the second control signal based on a first light intensity output from a first intensity detector to receive the third light beam, and a second light intensity output from a second intensity detector to receive the fourth light beam. For example, at the block 509, the process 500 may include generating the control signal 223 based on the first light intensity output 242 from the first intensity detector 241, and the second light intensity output 244 from the second intensity detector 243.

At a block 511, the process 500 may include generating the third control signal based on the optical mixer output, the first light intensity output, and the second light intensity output. For example, at the block 511, the process 500 may include generating the control signal 225 based on the optical mixer output 222, the first light intensity output 242, and the second light intensity output 244.

Figure 6:
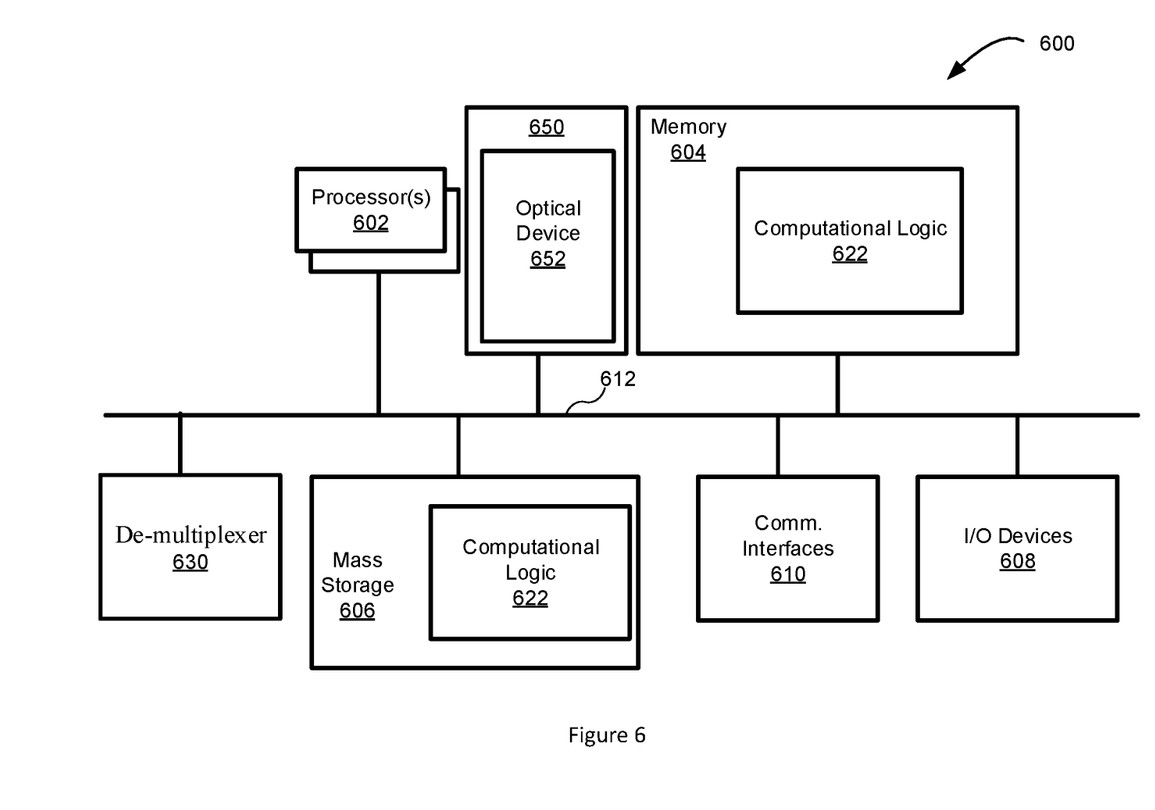
FIG. 6 schematically illustrates an example computing and optical device with a PDM de-multiplexer for use with various components and processes of FIGS. 1-5, according to various embodiments.

FIG. 6 schematically illustrates an exemplary computing and an optical device 600 with a PDM de-multiplexer 630 for use with various components and processes of FIGS. 1-5, such as the optical communication system 100 for PDM including a control signal generator 137 with three control signals, the DPC 133, and the receiver 135 described with respect to FIG. 1, the control signal generator 237 coupled to the DPC 233 and the receiver 235 described with respect to FIG. 2, the control signal generator 337 coupled to the receiver 335 described with respect to FIG. 3, the DPC 400 described with respect to FIG. 4, or the de-multiplexer to perform the process 500 described with respect to FIG. 5, according to various embodiments.

As shown, computing device 600 may include one or more processors or processor cores 602 and system memory 604. For the purpose of this application, including the claims, the terms "processor" and "processor cores" may be considered synonymous, unless the context clearly requires otherwise. The processor 602 may include any type of processors, such as a central processing unit (CPU), a microprocessor, and the like. The processor 602 may be implemented as an integrated circuit having multi-cores, e.g., a multi-core microprocessor. The computing device 600 may include mass storage devices 606 (such as diskette, hard drive, volatile memory (e.g., dynamic random-access memory (DRAM), compact disc read-only memory (CD-ROM), digital versatile disk (DVD), and so forth). In general, system memory 604 and/or mass storage devices 606 may be temporal and/or persistent storage of any type, including, but not limited to, volatile and non-volatile memory, optical, magnetic, and/or solid state mass storage, and so forth. Volatile memory may include, but is not limited to, static and/or dynamic random access memory. Non-volatile memory may include, but is not limited to, electrically erasable programmable read-only memory, phase change memory, resistive memory, and so forth.

The computing device 600 may further include input/output devices 608 (such as a display (e.g., a touchscreen display), keyboard, cursor control, remote control, gaming controller, image capture device, and so forth) and communication interfaces 610 (such as network interface cards, modems, infrared receivers, radio receivers (e.g., Bluetooth), and so forth). The computing device 600 may include an optoelectronic system 650 that may include an optical device 652. In addition, the computing device 600 may include a de-multiplexer 630, which may be similar to the de-multiplexer 130 in FIG. 1, or the de-multiplexer to perform the process 500 described with respect to FIG. 5. For example, the de-multiplexer 630 may include components such as the control signal generator 137 with three control signals, the DPC 133, and the receiver 135 described with respect to FIG. 1, the control signal generator 237 coupled to the DPC 233 and the receiver 235 described with respect to FIG. 2, the control signal generator 337 coupled to the receiver 335 described with respect to FIG. 3, or the DPC 400 described with respect to FIG. 4.

The communication interfaces 610 may include communication chips (not shown) that may operate the device 600 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network. The communication chips may also operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 610 may operate in accordance with other wireless protocols in other embodiments.

The above-described computing device 600 elements may be coupled to each other via system bus 612, which may represent one or more buses. In the case of multiple buses, they may be bridged by one or more bus bridges (not shown). Each of these elements may perform its conventional functions known in the art. In particular, system memory 604 and mass storage devices 606 may be employed to store a working copy and a permanent copy of the programming instructions, such as drivers, for the operation of various components of computer system 600, including but not limited to the operation of the control signal generator 137, the DPC 133, and the receiver 135 described with respect to FIG. 1, the control signal generator 237 coupled to the DPC 233 and the receiver 235 described with respect to FIG. 2, the control signal generator 337 coupled to the receiver 335 described with respect to FIG. 3, or the DPC 400 described with respect to FIG. 4, an operating system of computer system 600, and/or one or more applications, collectively referred to as computational logic 622. The various elements may be implemented by assembler instructions supported by processor(s) 602 or high-level languages that may be compiled into such instructions.

The permanent copy of the programming instructions may be placed into mass storage devices 606 in the factory or in the field through, for example, a distribution medium (not shown), such as a compact disc (CD), or through communication interface 610 (from a distribution server (not shown)). That is, one or more distribution media having an implementation of the agent program may be employed to distribute the agent and to program various computing devices.

The number, capability, and/or capacity of the elements 608, 610, 612 may vary, depending on whether computing device 600 is used as a stationary computing device, such as a set-top box or desktop computer, or a mobile computing device, such as a tablet computing device, laptop computer, game console, or smartphone. Their constitutions are otherwise known, and accordingly will not be further described.

For some embodiments, at least one of processors 602 may be packaged together with all or portions of computational logic 622 to facilitate aspects of embodiments described herein to form a System in Package (SiP) or a System on Chip (SoC).

The computing device 600 may include or otherwise be associated with an optoelectronic system that may include components and/or implement processes described with respect to FIGS. 1-5, such as the optical communication system 100, the control signal generator 137, the DPC 133, and the receiver 135 described with respect to FIG. 1, the control signal generator 237 coupled to the DPC 233 and the receiver 235 described with respect to FIG. 2, the control signal generator 337 coupled to the receiver 335 described with respect to FIG. 3, or the DPC 400 described with respect to FIG. 4. In some embodiments, at least some components of the optical communication system 100 may be communicatively coupled with the computing device 600 and/or be included in one or more of the computing device 600 components, such as communication interfaces 610, for example. In some embodiments, one or more components such as processor 602 may be included as a part of the optical communication system 100.

In various implementations, the computing device 600 may include one or more components of a data center, a laptop, a netbook, a notebook, an ultrabook, a smartphone, a tablet, a personal digital assistant (PDA), an ultra mobile PC, a mobile phone, or a digital camera. In further implementations, the computing device 600 may be any other electronic device that processes data.

EXAMPLES

Example 1 may include a control signal generator, comprising: an optical mixer to receive a first light beam and a second light beam to generate an optical mixer output; a first intensity detector to receive the first light beam and to generate a first light intensity output; a second intensity detector to receive the second light beam and to generate a second light intensity output; and a signal generator coupled to the optical mixer, the first intensity detector, and the second intensity detector, the signal generator to: receive the optical mixer output and to generate a first control signal to represent a phase difference between the first light beam and the second light beam; receive the first light intensity output and the second light intensity output and generate a second control signal to represent an intensity difference between the first light beam and the second light beam; and generate, based on the optical mixer output, the first light intensity output, and the second light intensity output, a third control signal to represent a rotation of a state of polarization (SOP) of the first light beam and the second light beam; wherein the first control signal, the second control signal, and the third control signal are to be coupled to a dynamic polarization controller (DPC).

Example 2 may include the control signal generator of example 1 and/or some other examples herein, wherein the first light beam and the second light beam are generated by the DPC based on the first control signal, the second control signal, and the third control signal.

Example 3 may include the control signal generator of any one of examples 1-2 and/or some other examples herein, wherein the first control signal has a first steady state, the second control signal has a second steady state, and the third control signal has a third steady state.

Example 4 may include the control signal generator of any one of examples 1-2 and/or some other examples herein, wherein the optical mixer includes a 50/50 directional coupler, a balanced photodetector coupled to the 50/50 directional coupler, and a transimpedance amplifier (TIA) coupled to the balanced photodetector.

Example 5 may include the control signal generator of any one of examples 1-2 and/or some other examples herein, wherein the first intensity detector includes a first photodetector to receive the first light beam, and a first transimpedance amplifier (TIA) coupled to the first photodetector to generate the first light intensity output.

Example 6 may include the control signal generator of any one of examples 1-2 and/or some other examples herein, further comprising: a first analog-to-digital converter coupled to the first intensity detector to receive the first light intensity output and to generate a first digital output; and a second analog-to-digital converter coupled to the second intensity detector to receive the second light intensity output and to generate a second digital output.

Example 7 may include the control signal generator of any one of examples 1-2 and/or some other examples herein, further comprising: an analog voltage subtractor coupled to the first intensity detector and the second intensity detector, to receive the first light intensity output and the second light intensity output, and to generate a subtractor output used to generate the second control signal.

Example 8 may include the control signal generator of example 7 and/or some other examples herein, further comprising: an analog multiplier coupled to the optical mixer to receive the optical mixer output, and coupled to the analog voltage subtractor to receive the subtractor output, and to generate a multiplier output used to generate the third control signal.

Example 9 may include the control signal generator of example 8 and/or some other examples herein, further comprising: a first integrator coupled to the optical mixer to receive the optical mixer output and to generate the first control signal, a second integrator coupled to the analog voltage subtractor to receive the subtractor output and to generate the second control signal, and a third integrator coupled to the analog multiplier to receive the multiplier output and to generate the third control signal.

Example 10 may include an optical communication device, comprising: a first phase shifter section controlled by a first control signal and to receive a first light beam and a second light beam; a second phase shifter section controlled by a second control signal and coupled to the first phase shifter section through a first directional coupler; and a third phase shifter section controlled by a third control signal, coupled to the second phase shifter section through a second directional coupler, and to generate a third light beam, and a fourth light beam; wherein the first control signal is related to a phase difference between the third light beam and the fourth light beam, the second control signal is related to an intensity difference between the third light beam and the fourth light beam, and the third control signal is related to a rotation of a state of polarization (SOP) of the third light beam and the fourth light beam.

Example 11 may include the optical communication device of example 10 and/or some other examples herein, wherein the first light beam is to carry a first data stream in a first polarization with a rotation of a SOP at an optical wavelength, the second light beam is to carry a second data stream at a second polarization with the rotation of the SOP at the optical wavelength, wherein the second polarization is orthogonal from the first polarization.

Example 12 may include the optical communication device of any one of examples 10-11 and/or some other examples herein, wherein the first light beam is to carry the first data stream in a transverse electric (TE) mode, and the second light beam is to carry the second data stream in a transverse magnetic (TM) mode orthogonal to the TE mode.

Example 13 may include the optical communication device of any one of examples 10-11 and/or some other examples herein, wherein the third light beam is obtained by removing the rotation of the SOP at the optical wavelength from the first light beam, and the fourth light beam is obtained by removing the rotation of the SOP at the optical wavelength from the second light beam.

Example 14 may include the optical communication device of any one of examples 10-11 and/or some other examples herein, wherein the rotation of the SOP at the optical wavelength is caused by a fiber channel.

Example 15 may include the optical communication device of any one of examples 10-11 and/or some other examples herein, further comprising: a receiver coupled to the third phase shifter section to receive the third light beam and the fourth light beam, and to detect the first data stream based on the third light beam, and to detect the second data stream based on the fourth light beam.

Example 16 may include the optical communication device of any one of examples 10-11 and/or some other examples herein, wherein the first control signal has a first steady state, the second control signal has a second steady state, and the third control signal has a third steady state.

Example 17 may include the optical communication device of any one of examples 10-11 and/or some other examples herein, further comprising: a polarization beam splitter (PBS) to receive a combined light beam from a fiber channel and to generate the first light beam and the second light beam.

Example 18 may include a method for optical communication, comprising: receiving a combined light beam from a fiber channel to generate a first light beam and a second light beam; adjusting, by a dynamic polarization controller (DPC), a rotation of a state of polarization (SOP) of the first light beam and the second light beam to generate a third light beam and a fourth light beam; and receiving, by the DPC, a first control signal, a second control signal, and a third control signal, wherein the third light beam and the fourth light beam are generated based on the first control signal, the second control signal, and the third control signal, and wherein the first control signal is related to a phase difference between the third light beam and the fourth light beam, the second control signal is related to an intensity difference between the third light beam and the fourth light beam, and the third control signal is related to a rotation of a SOP of the third light beam and the fourth light beam.

Example 19 may include the method of example 18 and/or some other examples herein, wherein the rotation of the SOP of the first light beam and the second light beam is caused by the fiber channel.

Example 20 may include the method of example 18 and/or some other examples herein, wherein the DPC includes: a first phase shifter section controlled by the first control signal and to receive the first light beam and the second light beam; a second phase shifter section controlled by the second control signal and coupled to the first phase shifter section through a first directional coupler; and a third phase shifter section controlled by the third control signal, coupled to the second phase shifter section through a second directional coupler, and to generate the third light beam, and the fourth light beam.

Example 21 may include the method of example 18 and/or some other examples herein, further comprising: generating the first control signal based on an optical mixer output from an optical mixer to receive the third light beam and the fourth light beam; generating the second control signal based on a first light intensity output from a first intensity detector to receive the third light beam, and a second light intensity output from a second intensity detector to receive the fourth light beam; and generating the third control signal based on the optical mixer output, the first light intensity output, and the second light intensity output.

Example 22 may include the method of example 21 and/or some other examples herein, wherein the generating the second control signal includes generating the second control signal based on a subtractor output generated by an analog voltage subtractor coupled to the first intensity detector and the second intensity detector.

Example 23 may include the method of example 22 and/or some other examples herein, wherein the generating the third control signal includes generating the third control signal based on a multiplier output generated by an analog multiplier coupled to the optical mixer to receive the optical mixer output, and coupled to the analog voltage subtractor to receive the subtractor output.

Example 24 may include the method of any one of examples 18-21 and/or some other examples herein, wherein the first control signal has a first steady state, the second control signal has a second steady state, and the third control signal has a third steady state.

Example 25 may include the method of any one of examples 18-21 and/or some other examples herein, wherein the first light beam is to carry a first data stream in a first polarization with the rotation of the SOP of the first light beam and the second light beam, the second light beam is to carry a second data stream at a second polarization with the rotation of the SOP of the first light beam and the second light beam, wherein the second polarization is orthogonal from the first polarization.

Example 26 may include one or more computer-readable media having instructions for optical communication, upon execution of the instructions by one or more processors, to perform the method of any one of examples 18-25.

Example 27 may include an apparatus for optical communication, comprising: means for receiving a combined light beam from a fiber channel to generate a first light beam and a second light beam; means for adjusting, by a dynamic polarization controller (DPC), a rotation of a state of polarization (SOP) of the first light beam and the second light beam to generate a third light beam and a fourth light beam; and means for receiving, by the DPC, a first control signal, a second control signal, and a third control signal, wherein the third light beam and the fourth light beam are generated based on the first control signal, the second control signal, and the third control signal, and wherein the first control signal is related to a phase difference between the third light beam and the fourth light beam, the second control signal is related to an intensity difference between the third light beam and the fourth light beam, and the third control signal is related to a rotation of a SOP of the third light beam and the fourth light beam.

Example 28 may include the apparatus of example 27 and/or some other examples herein, wherein the rotation of the SOP of the first light beam and the second light beam is caused by the fiber channel.

Example 29 may include the apparatus of example 27 and/or some other examples herein, wherein the DPC includes: a first phase shifter section controlled by the first control signal and to receive the first light beam and the second light beam; a second phase shifter section controlled by the second control signal and coupled to the first phase shifter section through a first directional coupler; and a third phase shifter section controlled by the third control signal, coupled to the second phase shifter section through a second directional coupler, and to generate the third light beam, and the fourth light beam.

Example 30 may include the apparatus of example 27 and/or some other examples herein, further comprising: means for generating the first control signal based on an optical mixer output from an optical mixer to receive the third light beam and the fourth light beam; means for generating the second control signal based on a first light intensity output from a first intensity detector to receive the third light beam, and a second light intensity output from a second intensity detector to receive the fourth light beam; and means for generating the third control signal based on the optical mixer output, the first light intensity output, and the second light intensity output.

Example 31 may include the apparatus of example 30 and/or some other examples herein, wherein the means for generating the second control signal includes means for generating the second control signal based on a subtractor output generated by an analog voltage subtractor coupled to the first intensity detector and the second intensity detector.

Example 32 may include the apparatus of example 31 and/or some other examples herein, wherein the means for generating the third control signal includes means for generating the third control signal based on a multiplier output generated by an analog multiplier coupled to the optical mixer to receive the optical mixer output, and coupled to the analog voltage subtractor to receive the subtractor output.

Example 33 may include the apparatus of any one of examples 27-30 and/or some other examples herein, wherein the first control signal has a first steady state, the second control signal has a second steady state, and the third control signal has a third steady state.

Example 34 may include the apparatus of any one of examples 27-30 and/or some other examples herein, wherein the first light beam is to carry a first data stream in a first polarization with the rotation of the SOP of the first light beam and the second light beam, the second light beam is to carry a second data stream at a second polarization with the rotation of the SOP of the first light beam and the second light beam, wherein the second polarization is orthogonal from the first polarization.

These modifications may be made to the disclosure in light of the above detailed description. The terms used in the following claims should not be construed to limit the disclosure to the specific implementation disclosed in the specification and the claims. Rather, the scope of the disclosure is to be determined entirely by the following claims, which are to be construed in accordance with established doctrines of claim interpretation.

The invention claimed is:

1. A control signal generator, comprising:
an optical mixer to receive a first light beam and a second light beam to generate an optical mixer output;
a first intensity detector to receive the first light beam and to generate a first light intensity output;
a second intensity detector to receive the second light beam and to generate a second light intensity output; and
a signal generator coupled to the optical mixer, the first intensity detector, and the second intensity detector, the signal generator to:
receive the optical mixer output and to generate a first control signal to represent a phase difference between the first light beam and the second light beam;
receive the first light intensity output and the second light intensity output and generate a second control signal to represent an intensity difference between the first light beam and the second light beam; and
generate, based on the optical mixer output, the first light intensity output, and the second light intensity output, a third control signal to represent a rotation of a state of polarization (SOP) of the first light beam and the second light beam;
wherein the first control signal, the second control signal, and the third control signal are to be provided to a dynamic polarization controller (DPC), wherein the first control signal has a first steady state, the second control signal has a second steady state, and the third control signal has a third steady state.

2. The control signal generator of claim 1, wherein the first light beam and the second light beam are generated by the DPC based on the first control signal, the second control signal, and the third control signal.

3. The control signal generator of claim 1, wherein the optical mixer includes a 50/50 directional coupler, a balanced photodetector coupled to the 50/50 directional coupler, and a transimpedance amplifier (TIA) coupled to the balanced photodetector.

4. The control signal generator of claim 1, wherein the first intensity detector includes a first photodetector to receive the first light beam, and a first transimpedance amplifier (TIA) coupled to the first photodetector to generate the first light intensity output.

5. The control signal generator of claim 1, further comprising:
a first analog-to-digital converter coupled to the first intensity detector to receive the first light intensity output and to generate a first digital output; and
a second analog-to-digital converter coupled to the second intensity detector to receive the second light intensity output and to generate a second digital output.

6. The control signal generator of claim 1, further comprising:
an analog voltage subtractor coupled to the first intensity detector and the second intensity detector, to receive the first light intensity output and the second light intensity output, and to generate a subtractor output used to generate the second control signal.

7. The control signal generator of claim 6, further comprising:
an analog multiplier coupled to the optical mixer to receive the optical mixer output, and coupled to the analog voltage subtractor to receive the subtractor output, and to generate a multiplier output used to generate the third control signal.

8. The control signal generator of claim 7, further comprising:
a first integrator coupled to the optical mixer to receive the optical mixer output and to generate the first control signal, a second integrator coupled to the analog voltage subtractor to receive the subtractor output and to generate the second control signal, and a third integrator coupled to the analog multiplier to receive the multiplier output and to generate the third control signal.

9. A method for optical communication, comprising:
receiving a combined light beam from a fiber channel to generate a first light beam and a second light beam;
adjusting, by a dynamic polarization controller (DPC), a rotation of a state of polarization (SOP) of the first light beam and the second light beam to generate a third light beam and a fourth light beam; and
receiving, by the DPC, a first control signal, a second control signal, and a third control signal, wherein the third light beam and the fourth light beam are generated based on the first control signal, the second control signal, and the third control signal, and
wherein the first control signal is related to a phase difference between the third light beam and the fourth light beam, the second control signal is related to an intensity difference between the third light beam and the fourth light beam, and the third control signal is related to a rotation of a SOP of the third light beam and the fourth light beam.

10. The method of claim 9, wherein the rotation of the SOP of the first light beam and the second light beam is caused by the fiber channel.

11. The method of claim 9, wherein the DPC includes:
a first phase shifter section controlled by the first control signal and to receive the first light beam and the second light beam;
a second phase shifter section controlled by the second control signal and coupled to the first phase shifter section through a first directional coupler; and a third phase shifter section controlled by the third control signal, coupled to the second phase shifter section through a second directional coupler, and to generate the third light beam, and the fourth light beam.

12. The method of claim 9, further comprising:
generating the first control signal based on an optical mixer output from an optical mixer to receive the third light beam and the fourth light beam;
generating the second control signal based on a first light intensity output from a first intensity detector to receive the third light beam, and a second light intensity output from a second intensity detector to receive the fourth light beam; and
generating the third control signal based on the optical mixer output, the first light intensity output, and the second light intensity output.

13. The method of claim 12, wherein the generating the second control signal includes generating the second control signal based on a subtractor output generated by an analog voltage subtractor coupled to the first intensity detector and the second intensity detector.

14. The method of claim 13, wherein the generating the third control signal includes generating the third control signal based on a multiplier output generated by an analog multiplier coupled to the optical mixer to receive the optical mixer output, and coupled to the analog voltage subtractor to receive the subtractor output.

15. The method of claim 9, wherein the first control signal has a first steady state, the second control signal has a second steady state, and the third control signal has a third steady state.

16. The method of claim 9, wherein the first light beam is to carry a first data stream in a first polarization with the rotation of the SOP of the first light beam and the second light beam, the second light beam is to carry a second data stream at a second polarization with the rotation of the SOP of the first light beam and the second light beam, wherein the second polarization is orthogonal from the first polarization.

* * * * *